US008504471B2

(12) United States Patent
Mobley

(10) Patent No.: US 8,504,471 B2
(45) Date of Patent: Aug. 6, 2013

(54) FACILITATING THE OWNERSHIP OF SOLAR-POWERED ELECTRICITY-GENERATING SYSTEMS

(75) Inventor: Martin D. Mobley, Fairfield, CT (US)

(73) Assignee: Morgan Stanley, New York, NY (US)

(*) Notice: Subject to any disclaimer, the term of this patent is extended or adjusted under 35 U.S.C. 154(b) by 0 days.

(21) Appl. No.: 13/565,094

(22) Filed: Aug. 2, 2012

(65) Prior Publication Data
US 2013/0036042 A1 Feb. 7, 2013

Related U.S. Application Data

(62) Division of application No. 12/274,217, filed on Nov. 19, 2008, now abandoned.

(60) Provisional application No. 61/038,916, filed on Mar. 24, 2008, provisional application No. 60/988,978, filed on Nov. 19, 2007.

(51) Int. Cl.
G06Q 40/00 (2012.01)

(52) U.S. Cl.
USPC ............... 705/38; 705/35; 705/40; 705/412

(58) Field of Classification Search
USPC ...................... 705/35, 40, 412, 38
See application file for complete search history.

(56) References Cited

U.S. PATENT DOCUMENTS

| 7,698,219 B2 | 4/2010 | Kremen et al. | |
| 7,890,436 B2 | 2/2011 | Kremen | |
| 7,925,552 B2 | 4/2011 | Tarbell et al. | |
| 2007/0150366 A1* | 6/2007 | Yahiro et al. | 705/26 |
| 2008/0091580 A1* | 4/2008 | Kremen | 705/35 |
| 2008/0091581 A1* | 4/2008 | Kremen | 705/35 |
| 2008/0091589 A1* | 4/2008 | Kremen | 705/38 |
| 2008/0091590 A1* | 4/2008 | Kremen | 705/38 |
| 2008/0091625 A1* | 4/2008 | Kremen | 705/412 |
| 2008/0091626 A1* | 4/2008 | Kremen | 705/412 |
| 2008/0172330 A1* | 7/2008 | Kremen et al. | 705/40 |
| 2008/0172346 A1* | 7/2008 | Kremen et al. | 705/412 |
| 2008/0270276 A1* | 10/2008 | Herzig | 705/35 |
| 2009/0024541 A1* | 1/2009 | Kremen | 705/36 T |
| 2009/0157545 A1 | 6/2009 | Mobley | |

(Continued)

OTHER PUBLICATIONS

State of Hawaii, "Tax Information Release No. 2007-02," Sep. 17, 2007, pp. 7-8.

(Continued)

Primary Examiner — Kenneth Bartley
(74) Attorney, Agent, or Firm — K&L Gates LLP

(57) ABSTRACT

Methods of facilitating a party's purchase of an electricity-generating solar power system are disclosed. The methods may comprise entering into, by the lender, an agreement with the party whereby, in exchange for a payment amount paid by the lender to a seller of the solar power system, the lender owns and is to sell up to 100% of the electricity generated by the party's solar power system after installation for a contract time period defined by the agreement. The methods may also comprise paying, by the lender, the payment amount to the seller for the solar power system. The contract time period may extend, for example, until sales of the electricity by the lender after installation generate an aggregate payment amount that meets or exceeds a specified level. The contract time period or unit quantity might also be fixed. The lender may also receive environmental attributes from the party.

20 Claims, 6 Drawing Sheets

U.S. PATENT DOCUMENTS

2010/0223180 A1* 9/2010 Kremen .......................... 705/40
2011/0202446 A1* 8/2011 Kremen .......................... 705/37
2012/0023039 A1* 1/2012 Kremen ...................... 705/36 T

OTHER PUBLICATIONS

Allan, Sterling D., "Residential Financing Available for Renewable Installations," Jul. 25, 2007, Pure Energy Systems, downloaded from http://pesn.com/2007/07/25/09500483 Residential Solar Financing/ on Mar. 25, 2008.

Cohen, Stephanie I., "Banks, manufacturers offer new ways to finance solar," Market Watch, Feb. 8, 2007, downloaded from http://www.marketwatch.com/story/banks-manufacturers-offer-financing-for-residential-solar on May 1, 2013.

Fehrenbacher, Katie, "Q&A with Berkeley Mayor Tom Bates on Solar Financing Plan," Nov. 6, 2007, downloaded from http://earth2tech.com/2007/11/06/ga-with-berkeley-mayor-tom-bates-on-solar-financing-plan/ on Mar. 25, 2008.

"Financing Renewable Energy Conference," downloaded from http://www.novoco.com/events/conferences/2008/sf energy/index.php on Mar. 25, 2008.

GE Money & Electric & Gas Industries Association Help Homeowners Save Money, Improve Environment with Nationwide Solar Financing, Jul. 25, 2007, General Electric News Center, downloaded from http://www.genewscenter.com/Content/detaIl.asp?ReleaseID=2515&NewsAreaID=2&PrintPreview=True on Mar. 25, 2008.

Jones, Carolyn, "Berkeley going solar—city pays up front, recoups over 20 years," Oct. 26, 2007, San Francisco Chronicle, downloaded from http://www.sfgate.com/cgi-bin/article.cgi?file=/c/a/2007/10/26/MNAIT0DQO.DTL on Mar. 25, 2008.

"New Resource Bank Customers Get Smart Solar Power from Innovative Solar Financing Program," Apr. 23, 2007, downloaded from http://www.csrwire.com/PressReleasePrint.php?id=8240 on Mar. 25, 2008.

"TechPractices: Solar Townhouses, Philadelphia, PA," downloaded from http://www.tollbase.org/Home-Building-Topics/Energy-Efeciency/Solar-Townhouses on Mar. 25, 2008.

Woody, Todd, "Berkeley to finance solar arrays for homeowners," Green Wombat, Oct. 27, 2007, downloaded from http://blogs.business2.com/greenwombat/2007/10/berkeley-to-fin.html on Mar. 25, 2008.

Graham, Marty, "Selling Homeowners a Solar Dream," Wired, Feb. 21, 2007, downloaded from http://www.wired.com/print/science/discoveries/news/2007/02/72752 on Nov. 2, 2007.

LaMonica, Martin, "Cutting solar panels' high price tag," Cnet News, Sep. 25, 2007, downloaded from http://news.cnet.com/Cutting-solar-panels-high-price-tag/2100-11392_3-6209791.html on May 1, 2013.

LaMonica, Martin, "Newsmaker: Does the solar industry need a Salesforce.com," Cnet News, Mar. 30, 2007, downloaded from news.cnet.com on May 1, 2013.

* cited by examiner

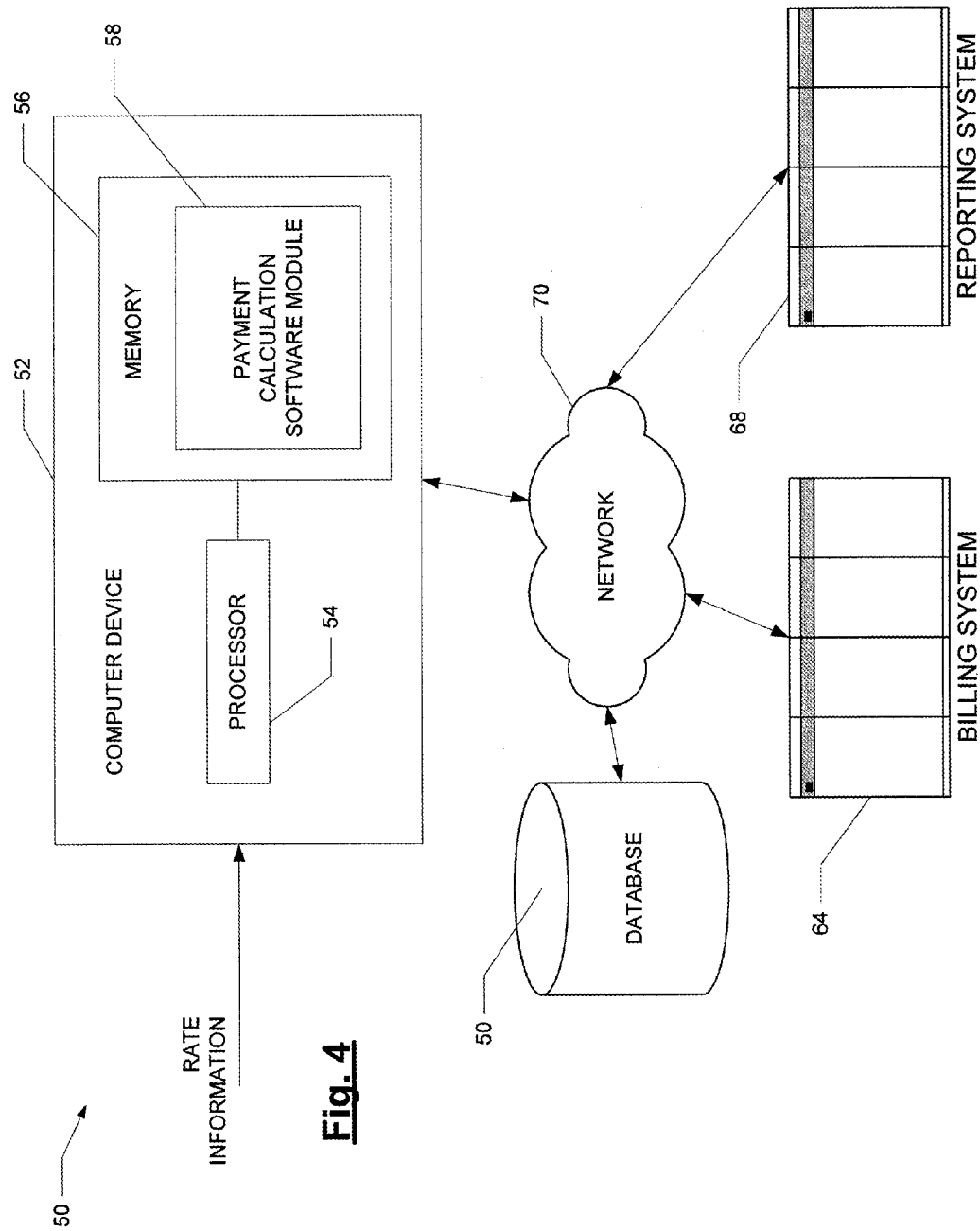

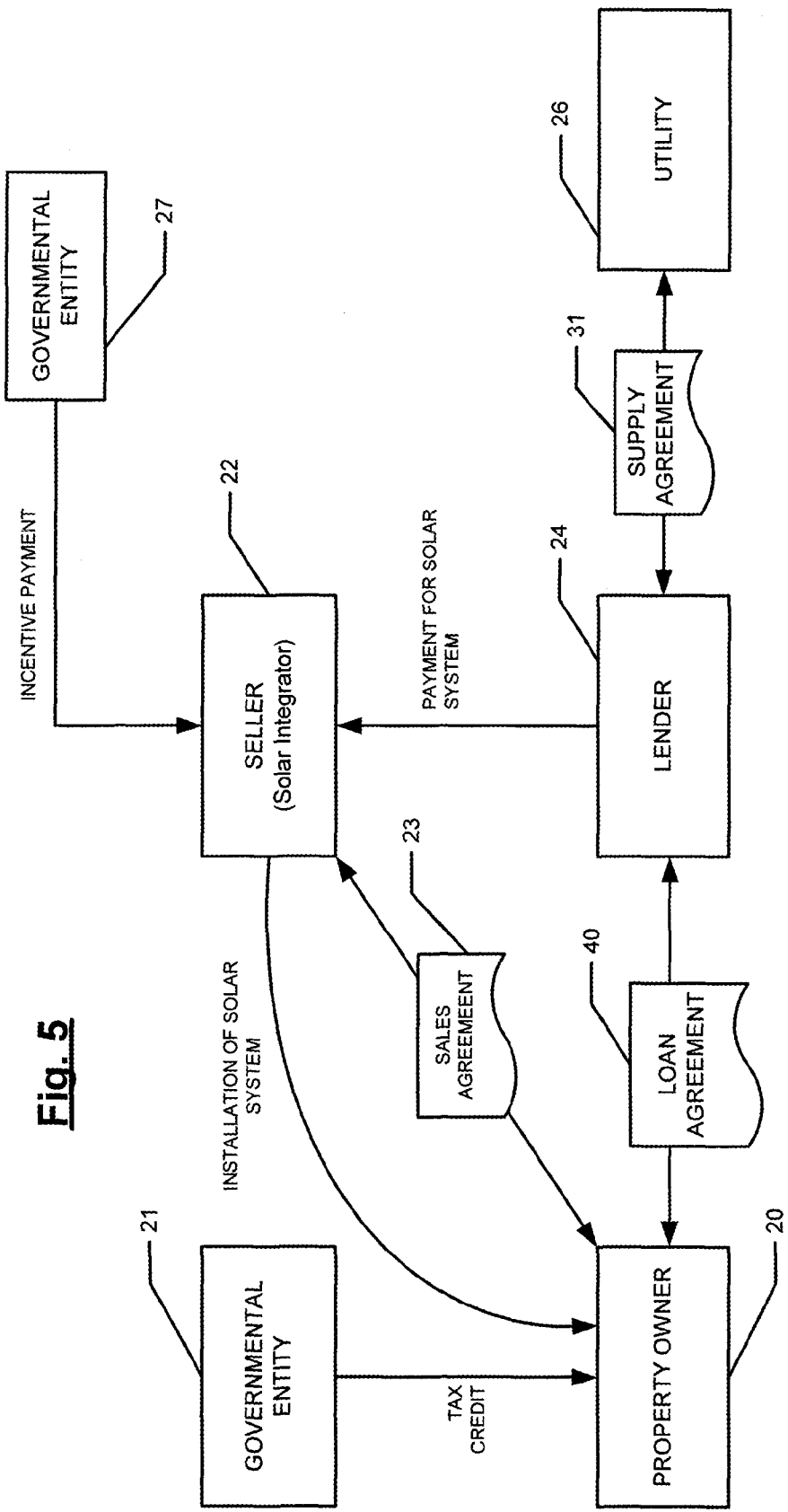

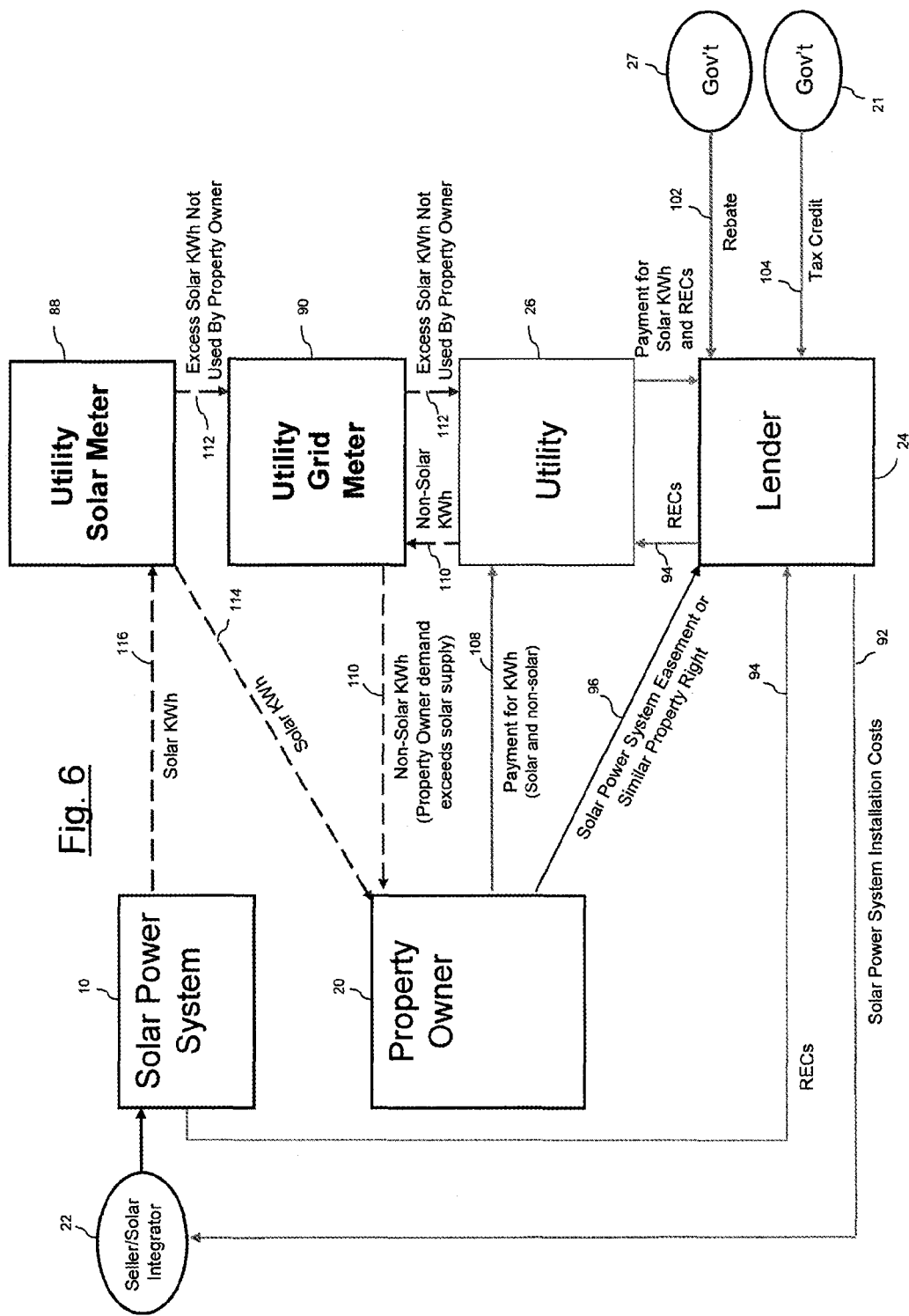

FACILITATING THE OWNERSHIP OF SOLAR-POWERED ELECTRICITY-GENERATING SYSTEMS

PRIORITY CLAIM

This application is a divisional of U.S. patent application Ser. No. 12/274,217, filed on Nov. 19, 2008, which claims the benefit of U.S. Provisional Application Ser. No. 60/988,978 filed on Nov. 19, 2007 and also claims the benefit of U.S. Provisional Application Ser. No. 61/038,916 filed on Mar. 24, 2008. U.S. patent application Ser. No. 12/274,217, U.S. Provisional Application Ser. No. 60/988,978 and U.S. Provisional Application Ser. No. 61/038,916 are all incorporated herein by reference in their entireties.

BACKGROUND

Many people have an interest in installing electricity-producing solar panels on their property because of the cost savings, governmental incentives, and environmental impact that solar power can provide. For almost as many people, however, the cost of purchasing and installing such solar panels is prohibitively expensive. For a typical two-story, 2,000-square-foot home, the cost to install solar panels and the related equipment for generating electrical power can range between $20,000 and $50,000. Many states provide cash rebates to homeowners and various other entities who install solar panels, but the rebate is usually only a small portion of the total installed costs. The remaining costs the homeowner or other entity (e.g., business owner, nonprofit organization or governmental entity) ("Property Owner or party") must pay are too great in many cases, which may be contributing to the delay of widespread adoption of residential solar power.

Recently, there have been several proposals to improve the economics of purchasing rooftop solar panels. One proposed business model is for a company (commonly referred to as a "solar integrator") that sells and installs solar panels and related equipment ("solar power system") to install the solar panels and related equipment at the Property Owner's property. However, the solar integrator retains ownership (and in this context is commonly referred to as a "PPA Provider") of the solar power system, and the Property Owner, instead of paying for the solar power system, merely pays for the electricity produced by the solar power system, which may be governed by the terms of a power purchase agreement ("PPA") or lease agreement or some combination of each. In some models, the electricity rate charged by the solar integrator is fixed below what the local utility is expected to charge over time. At the end of the lease or PPA term, which typically ranges from five to 25 years, the Property Owner usually has the right to purchase the equipment outright. In this type of arrangement, however, the Property Owner typically will not be entitled to federal tax credits or state rebates during the PPA term because the Property Owner is not the owner of the solar power system during this time period. Also, in this type of arrangement the solar integrator is exposed to the risks associated with billing the Property Owner for electricity for solar electricity used. For example, the solar integrator is forced to expend the administrative expense necessary to implement customer billing. Also, the solar integrator is exposed to the credit risk of each individual customer.

SUMMARY

In one general aspect, the present invention is directed to methods of facilitating a party's purchase and/or ownership of an electricity-generating solar power system (e.g., through the tracking and transfer of the electricity produced by the system). The party purchasing the solar power system may be a homeowner seeking to install the system at his/her home or other type of property owner. The financing (e.g., the funds to purchase and/or install the solar power system) may be provided by a lender. The method may comprise the step of entering into, by the lender, an agreement with the party ("Property Owner," e.g., homeowner), whereby, in exchange for a payment amount paid by the lender for the solar power system and its installation, the lender owns and is to sell (such as to the local electric utility) up to 100% of the electricity generated by the Property Owner's solar power system after installation for a contract time period defined by the agreement. In addition, the method may comprise the step of entering into, by the lender, a supply agreement with a third party, such as the local electric utility, to supply electricity generated by the Property Owner's solar power system for the contract time period. In such an arrangement, the Property Owner (e.g., the homeowner) owns the solar power system after installation.

The payment amount paid by the lender may be paid to a seller, or solar integrator, who sells and installs the system. Alternatively, the payment amount could be paid to the Property Owner, who pays the solar integrator. The contract time period, as described further below, may extend until, through sales of the electricity by the lender after installation, the aggregate payment amount received by the lender meets or exceeds a specified level. A computer device may be used to track the electricity sold (e.g., via communications with a meter) and determine the end of the contract time period. At that point, the lender would no longer own the electricity nor have the right to sell it. Rather, the Property Owner could use it to power their home (or other building). Alternatively, the contract time period could be fixed, based on estimates at the time of installation.

In addition, the Property Owner may assign to the lender, in connection with such a arrangement, all or a portion of any environmental attributes, such as renewable energy certificates (collectively, "RECs"), associated with the electricity generated by the solar power system. The lender may then sell the RECs in the secondary market or use the RECs to meet its own renewable portfolio standards requirements or similar regulatory mandates ("RPS"). The lender could also aggregate for sale a number of RECs from a number of Property Owners for whom the lender facilitated the purchase of solar power systems.

In various implementations, the payment amount may be paid by the lender to the seller (e.g., a solar integrator), and the payment amount may be a discounted price off the full retail price for the solar power system and its installation, less any incentive payments received by the seller (and/or down payment made by the Property Owner). The specified aggregate payment level (at which point the lender no longer receives the electricity generated by the solar power system) may be the full retail price of system and its installation less any incentive payment received by the seller (and/or down payment made by the Property Owner). Thus, the lender may earn an amount less than the retail price, although the lender's earning will be earned over the contract time period, which may span several years depending on the rate at which the lender sells, or estimates it can sell, the electricity. Preferably, the rate received by the lender from the utility is the utility's prevailing market rate or one substantially close thereto. During the contract time period, the electric utility may also deliver electric power to the Property Owner at the prevailing market rate. Preferably, the lender has market-based rate authority from the Federal Energy Regulatory Commission (FERC).

In another arrangement, the lender could sell the solar power system to the Property Owner. In such an arrangement, the lender could contract out the installation of the system. The lender would recoup the price of the system and its installation as before, through the receipt and sale of the electricity from the system. In yet another arrangement, the lender may lend proceeds to the Property Owner to purchase the solar power system. The Property Owner may repay the loan amount with electricity from the solar power system, which the lender may sell to the local utility per the supply agreement. In this way, the solar-generated electricity becomes a type of currency that the Property Owner uses to repay the lender. In each arrangement, ownership of the electricity will transfer from the lender to the local electric utility when it reaches a solar system meter that measures the quantity of electricity produced by the solar power system and tracks sales to the utility.

In yet another arrangement, the lender may maintain a full or partial property interest in the solar power system. The lender may be entitled to sell solar electricity generated by the solar power system and may sell said solar electricity to a utility, in which case ownership of the electricity would transfer from the lender to the utility when it reaches a solar system meter that measures the quantity of electricity produced by the solar power system and tracks sales to the utility. The utility may, in turn, sell the solar electricity to the Property Owner or other utility customer. The lender's ownership interest in the solar power system may be a full ownership interest or an interest that expires at some point in time (e.g., at the option of the lender or the Property Owner). For example, at the conclusion of a contract time period, ownership of the solar power system may transfer from the lender to the Property Owner.

The arrangements described above provide numerous benefits. In embodiments where the Property Owner (e.g., the homeowner) owns the system, the Property Owner may be entitled to federal tax credits. This is in contrast to many solar system financing structures where the Property Owner does not take immediate ownership of the system (if at all) and, as a result, is not eligible for federal tax credits. Also, the electric utility may have two sources of electricity to call upon in serving the Property Owner, one of which is a renewable energy source (the electricity from the Property Owner's solar system), which may help the utility meet its RPS requirements during the contract time period. Further, the lender could aggregate RECs or other types of renewable energy environmental attributes from a number of Property Owners and sell the aggregated RECs (or other types of environmental attributes) in, for example, commercially attractive lot sizes. Solar system meters associated with individual solar power systems may track the creation of REC's. In addition, the lender has no direct credit exposure to the Property Owner and does not collect electricity payments from the Property Owner. This is in contrast to many conventional financing arrangements where the solar integrator owns the installed solar power system and sells the electricity generated by the system (or leases the solar power system) to the Property Owner. These and other benefits of the invention will be apparent from the description to follow.

FIGURES

Various embodiments of the present invention are described herein by way of example in conjunction with the following figures, wherein:

FIG. 4 is a diagram of a computer system according to various embodiments of the present invention;

FIG. 5 illustrates a financing structure according to another embodiment of the present invention; and FIG. 6 illustrates a financing structure according to yet another embodiment of the present invention.

DETAILED DESCRIPTION

Various embodiments of the present invention are directed to systems for facilitating the purchase of a solar-powered electricity generating system (sometimes referred to herein as a "solar power system" or "solar system"). The techniques described herein can be used, for example, by residential homeowners to facilitate the purchase and installation of a solar power system for their home. The techniques could also be used to facilitate solar power system purchases for essentially any property owner, including, but not limited to, commercial property owners, industrial property owners, non-profit organizations, governmental entities, farmers, and schools. Before describing the techniques, a description of a typical solar power system may be useful. The description below describes a typical installation in a home, although it should be recognized that the invention covers nonresidential installations as well. Further, the description to follow describes one type of solar power system. Of course, the techniques described herein could be used for other types of systems.

Figure 1:
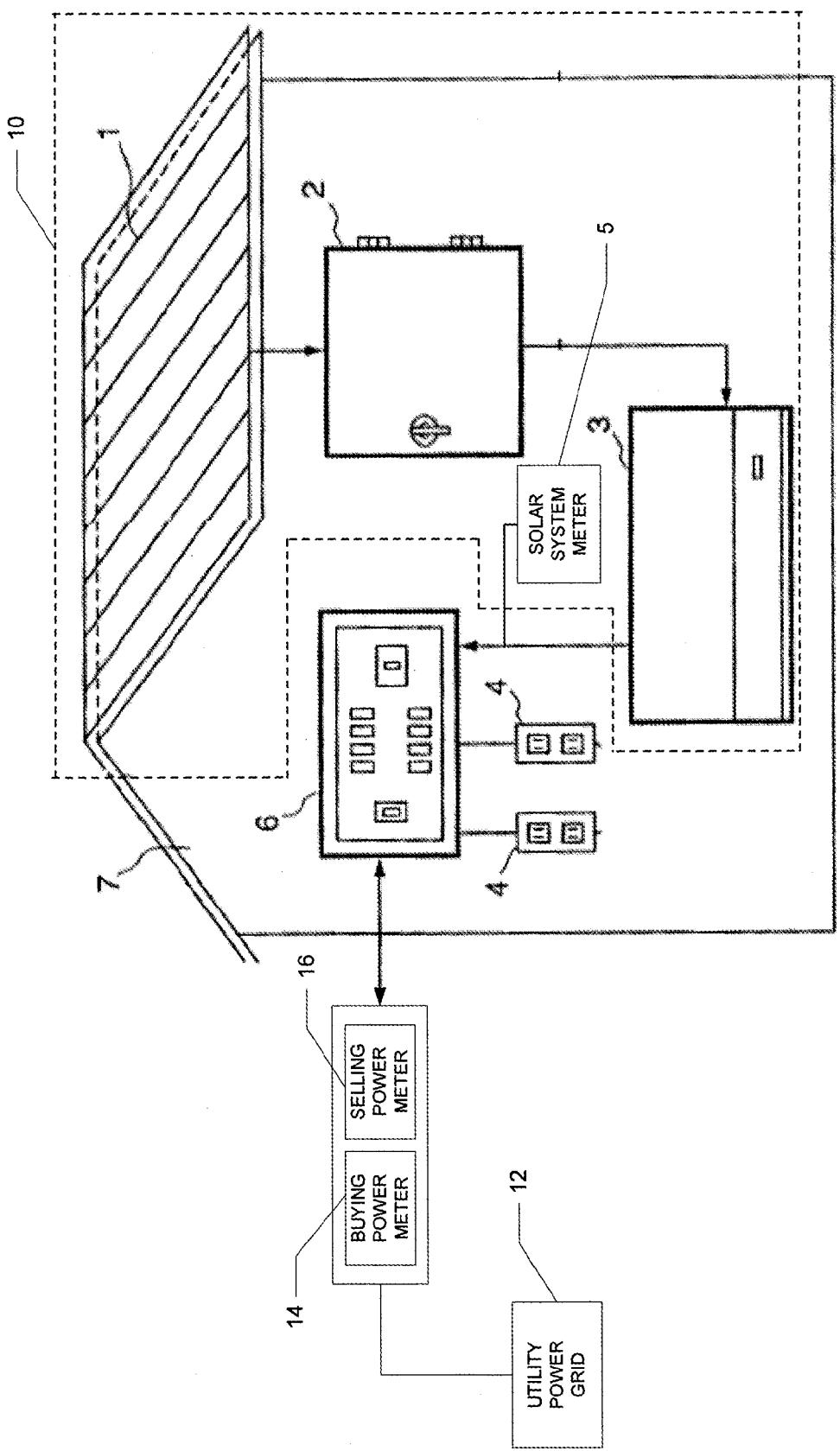
FIG. 1 is a diagram of a solar power system.

FIG. 1 is a simplified diagram of a house (or building) 7 having a solar power system 10. As shown in FIG. 1, the solar power system 10 may comprise an array 1 of solar panels (sometimes referred to as "photovoltaic modules") which may be (but are not required to be) located on the rooftop of the house 7. The solar panels may comprise, for example, a number of photovoltaic cells that are used to convert sunlight to electrical power. The number of panels may be appropriately determined so that a desired voltage level can be achieved. A collector box 2 may collect the output from the solar panels of the array 1 and forward it to a power conditioner 3. The power conditioner 3 may convert the DC power from the array 1 into AC power for use by the house 7 or for sale back to the electric utility servicing the house 7. A solar system meter 5 may measure the power generated by the solar power system 10.

The house 7 may further comprise, as shown in FIG. 1, a switchboard 6 that distributes electrical power throughout the house 7, such as from outlets 4. The switchboard 6 may receive power from the solar power system 10 as well as from the utility grid 12 servicing the house 7. A buying power meter 14 may measure the electrical power sold to the house 7 from the utility power grid 12, and a selling power meter 16 may measure the electrical power sold from the house 7 (and generated by the solar power system 10) to the utility. In other embodiments, rather than having separate power buying and selling meters, there may be a single meter that measures the net electrical power delivered by the utility to the house 7. In such an embodiment, if the amount of electricity sold from the house 7 was greater than the amount sold to the house over a given time period, the net power delivered to the house 7 would be negative over that time period.

As mentioned above, such solar power systems can be relatively expensive. For example, the present cost of a system for a 2,000-square-foot single family home can range from $20,000 to $50,000. At such a high cost, many homeowners often believe that it will take too long to recoup the costs of the investment through lower energy bills, or they simply cannot afford the investment. Therefore, many homeowners forego investing in solar power systems.

Figure 2:
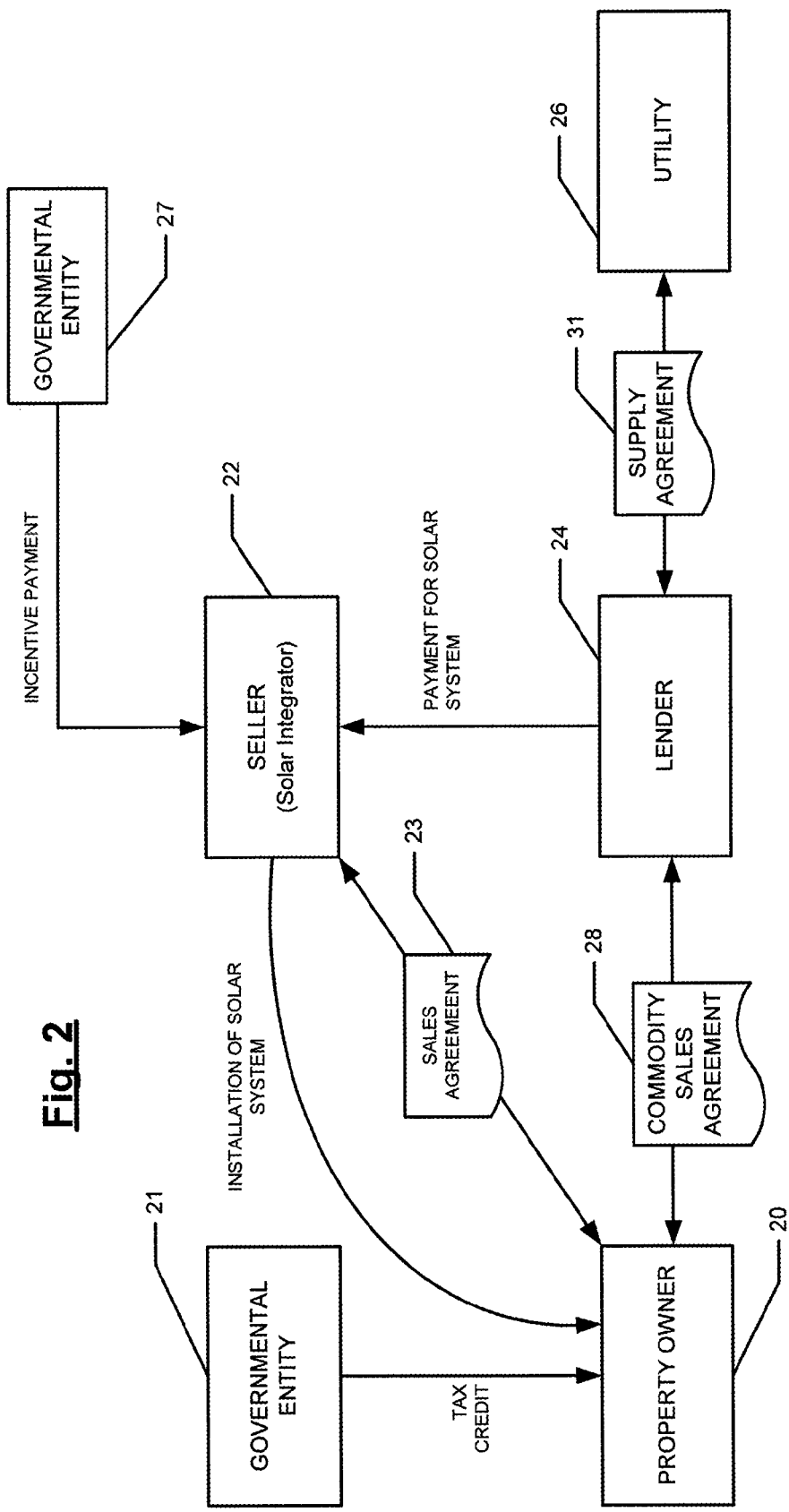
FIGS. 2 and 3 are block diagrams illustrating a financing structure for solar power systems according to various embodiments of the present invention.
Figure 3:
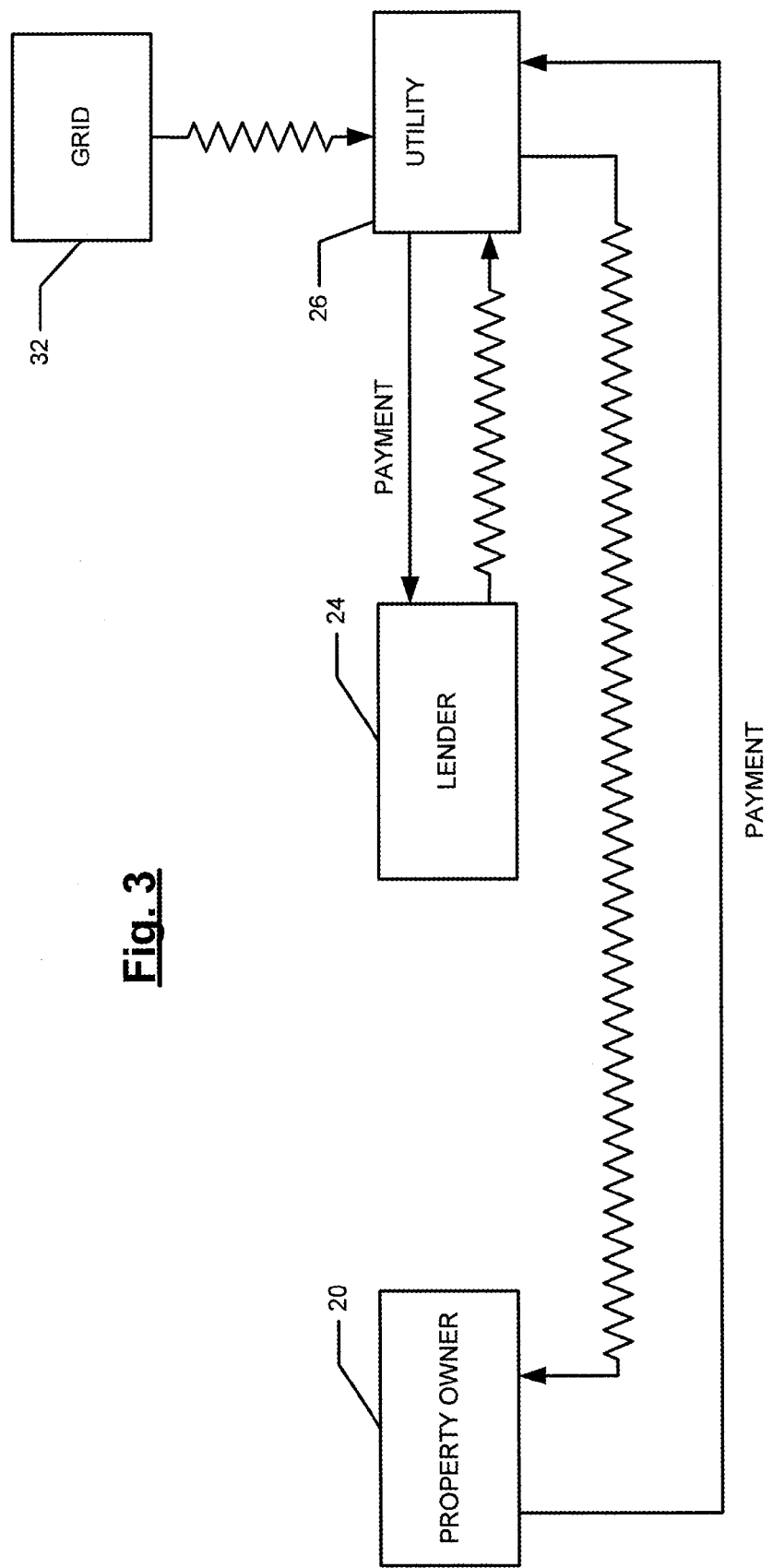

FIGS. 2 and 3 are diagrams illustrating in simplified form a transaction structure for facilitating the purchase of a solar power system by a Property Owner 20 from a seller 22 according to various embodiments. FIG. 2 shows the agreements and initial expenditures at the inception of the transaction. FIG. 3 shows the ongoing payments and electricity flows. As shown in FIG. 2, the Property Owner 20 and the seller 22 may enter into a sales agreement 23 stipulating the terms of the sale. The Property Owner 20, as mentioned above, may be a homeowner wishing to install the system in his/her home, or the owner of nonresidential property, for example. The seller 22 may be, for example, a manufacturer and/or an installer of the solar power system 10, such as a solar integrator. Although only one seller/solar integrator 22 is shown in FIG. 2 for the sake of convenience, there could be more than one seller/solar integrator in various embodiments. The purchase money is provided by a lender 24, which is described in more detail below.

Many states have cash incentive programs for residential and nonresidential solar power systems 10. These incentive payments are often related to the expected or actual energy producing capabilities of the system; higher energy producing systems (which generally cost more) are typically eligible for a greater incentive. Accordingly, the governmental entity (e.g., state) 27 in which the Property Owner 20 resides may pay the Property Owner 20 a rebate to pay partially for the system 10. Typically, as shown in FIG. 2, the state's payment may be paid directly to the solar integrator 22 or to another third party at the direction of the Property Owner 20, but it may also be paid directly to the Property Owner 20. The solar integrator 22 is preferably a state-eligible installer of such solar power systems.

In a preferred embodiment, neither the solar integrator 22 nor the lender 24 retains an ownership interest in the Property Owner's solar power system upon installation. Rather, once installed and/or once the solar integrator 22 is paid, the Property Owner 20 takes title to and owns the solar power system. Because the Property Owner 20 owns the system 10, the Property Owner may be eligible for tax credits from governmental entity 21, such as the federal government. Under current federal tax provisions, a Property Owner could claim a federal credit to cover 30% of the system's cost.

In the illustrated embodiment, the terms of the financing between the lender 24 and the Property Owner 20 are set forth in a form of commodity sales agreement 28, which, for reasons that will be apparent from the description to follow, is sometimes referred to herein as a "prepaid forward contract." Under the terms of the prepaid forward contract 28, the lender 24 pays the Property Owner 20 up-front for enough of the electricity generated by a proposed solar power system such that the Property Owner is able to purchase said system. However, the lender may pay the money directly to the solar integrator 22 on the Property Owner's behalf, as shown in FIG. 2. The price paid by the lender 24 may be some discounted amount off the retail price for the system (e.g., 85% of the retail price, including installation costs) less the amount of the state's incentive payment (if any) and/or Property Owner down payment (if any) to the solar integrator 22. In mathematical terms, suppose the full, non-discounted retail cost of the system is X, the state's incentive payment is Y, and the discount off the retail price the lender 24 receives is z (e.g., a 0.15 or 15% discount). Thus, the lender's payment to the solar integrator 22, referred to hereinafter as the "Lender Payment Amount," would be:

$$\text{Lender Payment Amount} = (1-z)X - Y$$

assuming no down payment by the Property Owner 20.

In exchange for the payment to the seller 22, under the terms of the prepaid forward contract 28, the lender 24 owns a physical commodity, i.e., the electricity generated by the Property Owner's solar power system 10 during the term (or period) of the prepaid forward contract (referred to as the "Prepaid Forward Contract Period"), which time period is further described below. Further, the lender 24 enters into a supply agreement 31 with the utility 26 to supply up to 100% of the electricity from the Property Owner's solar power system to the utility 26 during the Prepaid Forward Contract Period. Ownership of the electricity will transfer from the lender to the local electric utility when it reaches a solar system meter that measures the quantity of electricity produced by the solar power system and tracks sales to the utility. The agreement 31 may specify that the rate paid to the lender by the utility 26 is the prevailing rate for electricity charged by the utility 26 or substantially close to the prevailing rate (such as within a few percentage points of the prevailing rate). The prepaid forward contract 28 between the lender 24 and the Property Owner 20 may reference the supply agreement between the lender 24 and the utility 26, and may obligate the lender 24 to sell up to 100% of the electricity to the utility 26 (for resale to the Property Owner 20) and may obligate the utility, in turn, to sell that electricity to the Property Owner during the Prepaid Forward Contract Period.

As shown in FIG. 3, during the Prepaid Forward Contract Period, the lender 24 sells the electricity generated by the Property Owner's solar system to the utility 26. The utility 26, in turn, sells electricity to the Property Owner 20 for consumption by the Property Owner for powering the Property Owner's house or other building, the Property Owner 20 paying the prevailing rate to the utility 26. The utility 26 could sell the electricity from the lender 24 back to the Property Owner 20 and/or sell electricity from its grid 32 to the Property Owner. Thus, the utility 26 has two sources for delivering electricity to the Property Owner 20. As a convenient result of this arrangement, the Property Owner 20 would only get one electricity bill (from the utility 26) and would not have to make any ongoing payments for the solar system 10. Also, the lender may not be exposed to the risk and expense of billing the Property Owner directly. In addition, the Property Owner's total effective electricity rate would remain unchanged (or could even decrease to the extent the Property Owner retained some percentage of the electricity during the Prepaid Forward Contract Period) from before the installation to after during the Prepaid Forward Contract Period. Also, purchases by the utility 26 from the lender of the electricity produced by a solar power system should help the utility 26 meet its renewable portfolio standards (RPS) obligations.

According to various embodiments, the Prepaid Forward Contract Period ends when the lender 24 has sold enough electricity to the utility 26 (or another party) to recoup an amount of money equal to the full, non-discounted retail cost of the solar power system less the amount of the state's incentive payment (if any) and/or Property Owner down payment (if any). In mathematical terms, suppose the full, non-discounted retail cost of the system is X, the state's incentive payment is Y1, and the Property Owner down payment is Y2. Thus, the Prepaid Forward Contract Period ends when the lender recoups an amount of money from the utility 26 (or another party) equal to X−Y1−Y2, referred to hereinafter as the "Lender Return Amount." Thus, the Lender Return Amount may be expressed as follows:

$$\text{Lender Return Amount} = X - Y1 - Y2$$

Similarly, according to these various embodiments, the number of units of electricity received by the lender 24 during the Prepaid Forward Contract Period and sold to the utility 26 (or another party), multiplied by the price per unit of electricity paid by the utility 26 (or another party) would equal the Lender Return Amount. In mathematical terms, suppose the price paid by the utility 26 (or another party) during all relevant periods of time in the Prepaid Forward Contract Period, per unit of electricity is Z. Thus, the number of units of electricity received by the lender, referred to hereinafter as the "Lender Quantity," during the Prepaid Forward Contract Period would equal the Lender Return Amount divided by Z. Thus, the Lender Quantity may be expressed as follows:

$$\text{Lender Quantity} = \text{Lender Return Amount}/Z$$

That is, in one embodiment, the Prepaid Forward Contract Period lasts until the lender 24 recovers the Lender Return Amount from the utility 26 through the sale of the electricity received from the Property Owner's solar system.

Alternatively, the Prepaid Forward Contract Period could be a fixed time period, such as a number of months or years, or the Lender Quantity could be fixed, such as a number of units of electricity. The duration of the fixed contract time period or the fixed Lender Quantity preferably would be based on estimates at the time of installation regarding the amount of time required to achieve the Lender Return Amount. In such an embodiment, the lender 24 may own and sell up to 100% of the electricity from the Property Owner's solar system for the fixed period of time or until the Lender Quantity is achieved. The fixed time period or Lender Quantity may be chosen based on forecasts regarding electricity prices and solar power system efficiency so that the lender 24 is likely to be adequately compensated.

Regardless of whether the commodity sales agreement 28 has a fixed or a nonfixed term or quantity, the agreement 28 between the Property Owner 20 and the lender 24 may require the Property Owner 20 to assign or otherwise transfer to the lender 24 all or a portion of any RECs earned by the Property Owner 20 due to electricity generated by the solar power system over the term of the contract. The lender 24 may then sell the RECs in the secondary market or use the RECs to meet its own RPS requirements. The solar system meter 5 may directly or indirectly track the creation of REC's. For example, the solar system meter 5 may sense units of electricity generated by the solar system 10 and convert them to REC's. In some embodiments, the solar system meter 5 may report the units of electricity generated by the solar system 10, which may then be converted to REC's by another device.

According to various embodiments, the Lender Return Amount may be the nondiscounted retail cost of the Property Owner's solar power system 10 less the state's incentive payment (if any) less the Property Owner's down payment (if any). In most such arrangements, it may take five to ten years for the lender 24 to recover the Lender Return Amount. After that, the Property Owner will own all electricity generated by the solar power system 10 and will no longer have to deliver the electricity to the lender 24 (or, in other words, the lender 24 no longer owns the electricity generated by the system). The Property Owner 20 instead can use the electricity generated by the system 10 to power the Property Owner's house or other building, thereby reducing its reliance on power from the utility 26. Typically, solar panels are guaranteed to perform at or above a certain level for 20 to 30 thirty years, so if it took eight years for the lender 24 to recover the Lender Return Amount, the Property Owner 20 could probably use the system for its own benefit for another twelve to twenty-two years.

In such an arrangement, the lender 24 is providing the Property Owner 20 with the funds to pay for the solar power system 10 and its installation, which payment constitutes the up-front payment obligation of the lender 24 (paid to the seller 22) under the prepaid forward contract 28. In the illustrated arrangement, the lender 24 earns the difference between the discounted amount it paid to the solar integrator 24 for the solar power system 10 and the nondiscounted retail amount it recovers from the sale of the electricity generated by the system 10 to the utility during the term of the supply contract 28 (or zX), although the lender 24 earns this difference over the number of years it takes to sell enough electricity to recover the nondiscounted retail cost. As mentioned before, this may take five to ten years, for example, although it should be noted that since the ongoing sales of electricity to the utility 28 are at or close to the then-prevailing rates, if the price of electricity rises the Property Owner's obligation to the lender 24 under the prepaid forward contract 28 will be paid off sooner under certain embodiments.

Consider the following numerical example. Assume a homeowner is installing a 3 kW solar system that has a retail cost of $24,000. The state's incentive payment for such a system may be as much as $15,000. If the discount off the full retail price paid by the lender 24 is 15%, the Lender Payment Amount would be $5,400 (calculated as (1−0.15) times $24,000, less $15,000). The Lender Return Amount in this example, which is the quantity of money the lender 24 receives over the term of the supply contract through the sale of the electricity from the homeowner's solar power system to the utility 26, would be $9,000 (calculated as $24,000 minus $15,000).

In the illustrated embodiment, the lender 24 pays for the equipment and installation costs on the Property Owner's behalf directly to the solar integrator 22, although in other embodiments, the lender 24 may pay the funds to the Property Owner 20, who in turns pays the solar integrator 22.

Because the lender 24 sells the electricity generated by the Property Owner's solar power system 10 during the term of the prepaid forward contract 28, the lender 24 preferably has market-based rate authority from the Federal Energy Regulatory Commission (FERC).

As mentioned above, pursuant to the prepaid forward contract 28, the Property Owner 20 may transfer or assign to the lender 24 RECs. In states that have a REC program, a green energy provider typically is credited with one REC for every 1,000 kWh of electricity it produces. An average residential customer consumes about 800 kWh in a month. Thus, the lender 24 could earn about ten or so RECs per year for each such deal with a residential homeowner. The lender 24 could then sell the RECs in the secondary market or use the RECs to meet its own RPS requirements. Further, where the lender 24 facilitates the purchase of solar power systems for a number of Property Owners, the lender 24 could aggregate the RECs from the various Property Owners and package them in unit sizes that are more attractive for sale in the commercial market, e.g., one hundred RECs, or the lender could use the RECs to meet its own RPS requirements.

Variations of the above-described transaction structure could also be used and are within the scope of the present invention. For example, the Property Owner could be a homeowner seeking to install the system at his/her house, although it should be recognized that aspects of the invention are also applicable to other types of buildings and/or to nonresidential property owners. In addition, instead of a discounted price, the lender 24 may pay the solar integrator 22 the full retail price (less any state incentives). In such an embodiment, the Lender Quantity may be full retail price plus a premium (less any state incentives).

In another embodiment, the lender 24 may own the solar power system before installation. In such embodiments, the lender 24 may hire and pay an installer to install the solar power system. In this arrangement, the Property Owner 20 may own the system upon installation as before, with the lender 24 owning and selling up to 100% of the electricity received from the Property Owner pursuant to the prepaid forward contract. The Lender Return Amount in such an embodiment may be the price of the solar panel system charged by the lender, plus installation costs, plus a premium, less any incentive payments and/or down payments by the Property Owner 20. Such an embodiment could be beneficial because, due to economies of scale, the price of the solar panel system charged by the lender 24 plus the installation costs may be less than the discounted retail price the lender 24 pays the seller in the embodiments described above. Similarly, in this embodiment, the agreement between the lender 24 and the Property Owner 20 may require the Property Owner 20 to transfer and assign all or a portion of the RECs or other environmental attributes earned by the Property Owner 20 to the lender 24, who may resell them in the secondary market or use the RECs to meet its own RPS requirements.

In another embodiment, as shown in FIG. 5, the lender 24 may lend the Property Owner 20 the funds to purchase the solar power system and its installation pursuant to a loan agreement 40. In such an embodiment, the Property Owner 20 may repay the loan amount to the lender with electricity from the system 10, which the lender 24 may sell to the utility 26 until it has been fully reimbursed with applicable interest, if any. As part of the lending arrangement, the Property Owner 20 may also be required to transfer and or assign all or some of the RECs acquired by the Property Owner 20 to the lender 24.

In yet another embodiment, shown in FIG. 6, the lender 24 may retain a property interest in the solar power system 10 after its installation. The various contractual relationships set forth in FIG. 6 may be established by one or more agreements or contracts between the lender 24, the utility 26 and/or the Property Owner 20. For example, the obligations of the lender 24 and the Property Owner 20 relative to one another may be set forth in a loan agreement 40, a commodity sales agreement 28 or other suitable instrument. The obligations of the lender 24 and the utility 26 relative to one another may be set forth in a supply agreement 31 or other suitable document.

In the transaction shown, the lender 24 may facilitate the purchase of the solar power system 10, for example, by making a payment directly to a seller and/or solar integrator 22, or by making a payment to the Property Owner 20, who may, in turn, pay the seller 22. During a contract time period (e.g., the Prepaid Forward Contract Period described above or another time period agreed to by the parties) the lender 24 may take or retain a property interest in the solar power system 10. The lender's property interest in the solar power system 10 may be a complete or partial interest. For example, the lender 24 may become the outright owner, having full ownership of the solar power system 10 throughout its useful lifetime, or some shorter period of time. Ownership of the electricity generated by the solar power system 10 may reside with the lender 24 indefinitely. According to various embodiments, however, electricity generated by the solar power system 10 after the expiration of the contract time period may be owned by the Property Owner. Renewable energy environmental attributes generated as a result of the solar power system 10 may be assigned to, or retained by, the lender 24 even after the expiration of the contract time period.

Also, for example, the lender 24 may take an expiring interest in the solar power system 10 (e.g., an interest expiring at the conclusion of the contract time period, at the option of the lender and/or the Property Owner, etc.). The lender's property interest in the solar power system 10 may be any suitable property interest available under the applicable law including, for example, an easement or similar property interest against the property owner's property (e.g., the property where the solar power system 10 is to be installed). According to various embodiments, the lender 24 may also take an additional property interest in the property where the system 10 is installed. For example, the lender 24 may take an easement, granting the lender 24 access to the property owner's property. This may allow the lender 24 to reach and perform maintenance on the system 10 after installation. In embodiments where the lender 24 has less than all of the ownership interest in the solar power system 10, the property owner may retain a property interest in the system 10 even during the contract time period. The property owner's interest may be any suitable property interest available under the applicable law including, for example, a future interest.

The length of the contract time period, may be determined as described above. For example, the contract time period may expire after the passage of a predetermined amount of time. Also, according to various embodiments, it may expire after the lender 24 has received some combination of electricity 116 and/or environmental attributes 94 (e.g., REC's) reaching a Lender Quantity. The Lender Quantity may be found in any suitable way including, for example, those described herein above.

During the contract time period, some or all of the solar electricity 116 generated by the solar power system 10 (e.g., up to 100%) may be owned by the lender 24. Physically, however, electricity 116 may be provided to the utility 26, which may, in turn, reimburse the lender 24 with payment 98. Also, as described above, the utility 26 may sell all or a portion of the electricity 116 to the Property Owner 20.

As shown in FIG. 6, solar electricity 116 is routed to a utility-grade solar system meter 88, which may measure the total amount of solar electricity generated (e.g., in KWh or another suitable unit), track sales to the local utility, track REC creation, etc. At the solar system meter 88, customer solar electricity 114 may be provided to the Property Owner 20. According to embodiments where the Property Owner 20 is a landlord, customer solar electricity 114 may be provided to a tenant of the Property Owner 20. If the total solar electricity 116 generated by the solar power system 10, which may be owned by the lender, exceeds the customer solar electricity 114 (e.g., the electricity used by the Property Owner 20), then excess electricity 112 may be provided to the grid, for example, via a utility grid meter 90. If the total amount of electricity used by the Property Owner 20 exceeds the total solar electricity 116, then non-solar electricity 110 may be provided to the Property Owner 20 from the utility 26 (e.g., via utility grid meter 90). The Property Owner 20, or tenant, may remit payment 108 for the customer solar electricity 114 and non-solar customer electricity 110, if any, to the utility 26. In this way, the billing expenses and risk may be assumed by the utility 26. It will be appreciated that utility 26 is already exposed to the risks and expenses of individual customer billing.

It will be appreciated that any suitable meter/connection configuration may be utilized in addition to or instead of the set-up shown in FIG. 6 including, for example, the configuration illustrated in FIG. 1 and including switchboard 6 and meters 5, 14 and 16. Likewise, the meter/connection configuration illustrated in FIG. 6 may be utilized with any other embodiments.

According to the transaction shown in FIG. 6, the lender 24 may also receive various rebates, tax incentives and environmental attributes resulting from the solar power system 10. For example, environmental attributes 94 such as renewable energy credits (REC's), carbon or carbon-related credits, etc., may accrue to either the Property Owner 20 and/or the lender 24. If all or a portion of the environmental attributes 94 accrue to the Property Owner 20, then the Property Owner 20 may be obligated to transfer the environmental attributes 94 to the lender 24, as shown. The lender 24 may, in turn, either sell the attributes 94, or use them to meet its own RPS requirements. In addition to environmental attributes, the lender 24 may also receive governmental incentives, such as rebates 102 and/or tax credits 104. For example, the lender 24 may receive one or more rebates 102 from one or more government entities 27 (e.g., a state government). If the rebates 102 would otherwise accrue to the Property Owner 20, then they may be assigned to the lender 24 under the agreement. Also, the lender 24 may be entitled to receive a tax credit 104 from one or more government entities (e.g., the federal government) based on its investment in the solar power system 10. According to various embodiments, the governmental entities 21 and 27 may be the same governmental entity or agency.

FIG. 4 is a diagram of a computer system 50 that may be used (i) to calculate the amount of payments owed by the utility 26 to the lender 24 during the Prepaid Forward Contract Period pursuant to the supply agreement 31 and (ii) to aggregate those payments to determine when the Lender Quantity is reached. As shown in FIG. 4, the computer system 50 may comprise a computer device 52, such as a personal computer, a service, a laptop, a mainframe, a workstation, or any other suitable computer device. Although only one computer device 52 is shown in FIG. 4, the system 50 may comprise one or a number of networked computer devices 52.

The computer device 52 may comprise one or more processors 54 and one or more memory units 56 (although only one of each is shown in FIG. 4). The processor 54 may be single or multiple core. The memory 56 may be any suitable type of computer-readable medium, such as, for example, random access memory (RAM), read-only memory (ROM), a magnetic medium, such as a hard drive or floppy disk, or an optical medium, such as a CD-ROM. As shown in FIG. 4, the memory 56 may comprise a payment calculation software module 58. The payment calculation software module 58 may be implemented as software code to be executed by the processor(s) 54 using any suitable computer language. The software code may be stored as a series of instructions or commands in the memory 56.

When the processor 54 executes the code of the payment calculation software module 58, the processor may be caused to calculate the amount of the payments owed by the utility 26 to the lender 24 for the electricity sold by the lender 24 to the utility 26. The processor 54 may calculate the payments based on meter data stored in a database 60. For each Property Owner account, the database 60 may store readings from the appropriate meter or meters (e.g., the power-selling meter 16 of FIG. 1, the Utility Solar Meter 88 and/or Utility Grid Meter 90 of FIG. 6, etc.) The meter readings may be collected, for example, manually or by using automatic or remote metering, including web-based monitoring of the meters. The meter data may be transmitted electronically over communication links, such as RS-232 or RS-485 wired links, and/or Power Radio, GSM, GPRS, Bluetooth, or IrDA wireless links. The meter readings may be transmitted electronically to the database 60, for billing and reporting purposes, as described below.

Based on the readings at the prevailing rate for electricity (which the system 50 may receive through a data feed and/or which may be stored in the database 60), the processor 54 may calculate the payment amount. The processor 54 may also aggregate the payments for each Property Owner account to determine when they reach the Lender Quantity. As mentioned before, according to various embodiments, when the Lender Quantity is reached, the prepaid forward contract expires and the lender 24 no longer owns and sells the electricity from the Property Owner's solar system to the utility 26. Instead, the Property Owner 24 may use the electricity to power his/her house.

The payment amounts calculated by the system 50 could be stored in the database 60 or another store associated with the computer system 50. In addition, they could be transmitted electronically to a computerized bill generation system 64 to generate bills (either electronic and/or paper) for the utility. In addition, the aggregated payment values computed by the system 50 could be stored in the database 60 or another store associated with the computer system 50. They could also be transmitted electronically to a computerized reporting system 68, which may generate a report (either electronic and/or paper) for the Property Owner 20. The billing system 64 and the reporting system 68 may be implemented with a number of servers or mainframes, for example, in communication with the computer system 50 via a communication network 70, such as a LAN, MAN, WAN, or other suitable network.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments while eliminating, for purposes of clarity, other elements. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware that may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

The processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

Certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to the operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. For example, any server described herein may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks, such as, for example, tracking demand for processing power from different machines, prioritizing and scheduling tasks based on network demand, and/or providing backup contingency in the event of a component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for facilitating, by a lender, a property owner's purchase of an electricity-generating solar power system, the system comprising:

a computer comprising at least one processor and associated memory, wherein the computer is programmed to:

receive data describing a retail price of the solar power system, data describing a government incentive payment for the purchase of the solar power system, and data describing a discount from the retail price;

determine a payment amount to be paid by the lender for the solar power system, wherein the payment amount is based on a plurality of factors comprising the retail price of the solar power system, the government incentive payment for purchase of the solar power system, and the discount from the retail price;

receive a reading from a solar system meter, the solar system meter in communication with the solar power system installed at a property owned by the property owner, wherein the reading indicates an amount of electricity generated by the solar power system, and wherein the lender owns a first property interest in the solar power system;

determine whether a contract time period has expired, wherein determining whether the contract time period has expired comprises comparing a cumulative price of electricity generated by the solar power system and sold by the lender to the payment amount, wherein the contract time period is defined by an agreement between at least the property owner and the lender, and wherein, according to terms of the agreement in exchange for the payment amount, the lender owns and is to sell at least a portion of the electricity generated by the solar power system;

when the contract time period has not expired, determine a portion of the amount of electricity generated by the solar power system that is owned by the lender, wherein the determining the portion of the amount of electricity generated by the solar power system that is owned by the lender comprises considering the terms of the agreement; and determine a price for the portion of the amount of electricity generated by the solar power system considering the reading and a price per unit of electricity.

2. The system of claim 1, wherein determining the payment amount comprises determining the payment amount based on:

$$\text{Payment amount} = (1-z)X - Y$$

wherein z is the discount from the retail price;
wherein X is the retail price of the solar power system; and
wherein Y is the government incentive payment.

3. The system of claim 1, wherein the computer is further programmed to track electricity from the portion of the amount of electricity generated by the solar power system that is sold by the lender.

4. The system of claim 1, wherein the portion of the amount of electricity generated by the solar power system is provided to a third party according to at least one term of a supply agreement.

5. The system of claim 1, wherein the payment amount is directed by the lender to a solar integrator that sells and installs the solar power system.

6. The system of claim 1, wherein the computer is further programmed to determine a portion of renewable energy environmental attributes associated with the solar power system that are to be transferred to the lender.

7. The system of claim 6, wherein the renewable energy environmental attributes comprise at least one of renewable energy certificates and carbon credits.

8. The system of claim 6, wherein all of the renewable energy certificates associated with the solar power system during a contract time are to be transferred to the lender.

9. The system of claim 1, wherein determining whether the contract period has expired comprises at least one action selected from the group consisting of retrieving a predetermined amount of time; monitoring whether the lender has owned a specified quantity of electricity; and monitoring whether the cumulative price of electricity generated by the solar power system and sold by the lender exceeds a specified aggregate payment level.

10. The system of claim 1, wherein determining whether the cumulative price of electricity generated by the solar power system meets or exceeds a lender return amount, wherein the lender return amount is calculated considering:

$$\text{Lender return amount} = X - Y1 - Y2$$

wherein, X is the retail cost of the solar power system;
wherein, Y1 is the government incentive payment for purchase of the solar power system; and
wherein Y2 is a down payment provided by the property owner.

11. A computer method for facilitating, by a lender, a property owner's purchase of an electricity-generating solar power system, the method comprising:
receiving, by a computer comprising at least one processor and associated memory, data describing a retail price of the solar power system, data describing a government incentive payment for the purchase of the solar power system, and data describing a discount from the retail price;
determining, by the computer, a payment amount to be paid by the lender for the solar power system, wherein the payment amount is based on a plurality of factors comprising the retail price of the solar power system, the government incentive payment for purchase of the solar power system, and the discount from the retail price;
receiving, by the computer a reading from a solar system meter, the solar system meter in communication with the solar power system installed at a property owned by the property owner, wherein the reading indicates an amount of electricity generated by the solar power system, and wherein the lender owns a first property interest in the solar power system;
determining, by the computer, whether a contract time period has expired, wherein determining whether the contract time period has expired comprises comparing a cumulative price of electricity generated by the solar power system and sold by the lender to the payment amount, wherein the contract time period is defined by an agreement between at least the property owner and the lender, and wherein according to terms of the agreement, in exchange for the payment amount, the lender owns and is to sell at least a portion of the electricity generated by the solar power system;
when the contract time period has not expired, determining, by the computer a portion of the amount of electricity generated by the solar power system that is owned by the lender, wherein the determining the portion of the amount of electricity generated by the solar power system that is owned by the lender comprises considering the terms of the agreement; and determining, by the computer, a price for the portion of the amount of electricity generated by the solar power system considering the reading and a price per unit of electricity.

12. The method of claim 11, wherein determining the payment amount comprises determining the payment amount based on:

$$\text{Payment amount} = (1-z)X - Y$$

wherein z is the discount from the retail price;
wherein X is the retail price of the solar power system; and
wherein Y is the government incentive payment.

13. The method of claim 11, further comprising tracking electricity from the portion of the amount of electricity generated by the solar power system that is sold by the lender.

14. The method of claim 11, wherein the portion of the amount of electricity generated by the solar power system is provided to a third party according to at least one term of a supply agreement.

15. The method of claim 11, wherein the payment amount is directed by the lender to a solar integrator that sells and installs the solar power system.

16. The method of claim 11, further comprising determining a portion of renewable energy environmental attributes associated with the solar power system that are to be transferred to the lender.

17. The method of claim 16, wherein the renewable energy environmental attributes comprise at least one of renewable energy certificates and carbon credits.

18. The method of claim 16, wherein all of the renewable energy certificates associated with the solar power system during a contract time are to be transferred to the lender.

19. The method of claim 11, wherein determining whether the contract period has expired comprises at least one action selected from the group consisting of retrieving a predetermined amount of time; monitoring whether the lender has owned a specified quantity of electricity; and monitoring whether the cumulative price of electricity generated by the solar power system and sold by the lender exceeds a specified aggregate payment level.

20. The method of claim 11, wherein determining whether the cumulative price of electricity generated by the solar power system meets or exceeds a lender return amount, wherein the lender return amount is calculated considering:

$$\text{Lender return amount} = X - Y1 - Y2$$

wherein, X is the retail cost of the solar power system;
wherein, Y1 is the government incentive payment for purchase of the solar power system; and
wherein Y2 is a down payment provided by the property owner.

* * * * *